(12) United States Patent
Hashimoto et al.

(10) Patent No.: US 7,037,567 B2
(45) Date of Patent: May 2, 2006

(54) HONEYCOMB STRUCTURE

(75) Inventors: Shigeharu Hashimoto, Okazaki (JP); Tadato Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 198 days.

(21) Appl. No.: 10/480,000

(22) PCT Filed: Jun. 24, 2002

(86) PCT No.: PCT/JP02/06263

§ 371 (c)(1),
(2), (4) Date: Dec. 8, 2003

(87) PCT Pub. No.: WO03/002231

PCT Pub. Date: Jan. 9, 2003

(65) Prior Publication Data

US 2004/0142145 A1 Jul. 22, 2004

(30) Foreign Application Priority Data

Jun. 29, 2001 (JP) .............................. 2001-199732

(51) Int. Cl.
*B32B 3/12* (2006.01)

(52) U.S. Cl. ...................... 428/116; 428/188; 428/192; 428/73; 428/34.4; 428/689; 502/439

(58) Field of Classification Search ................ 428/116, 428/188, 192, 73, 34.4, 689; 502/439
See application file for complete search history.

(56) References Cited

U.S. PATENT DOCUMENTS

| | | | |
|---|---|---|---|
| 3,505,158 A | 4/1970 | Murray | |
| 4,233,351 A * | 11/1980 | Okumura et al. | 502/439 |
| 4,335,783 A | 6/1982 | McBrayer et al. | |
| 5,914,187 A * | 6/1999 | Naruse et al. | 428/327 |
| 2002/0197193 A1 * | 12/2002 | Harada et al. | 422/177 |
| 2003/0053940 A1 * | 3/2003 | Harada et al. | 422/180 |

FOREIGN PATENT DOCUMENTS

| | | |
|---|---|---|
| EP | A 0816 065 | 1/1998 |
| JP | A 54-150406 | 11/1979 |
| JP | A 55-147154 | 11/1980 |
| JP | B2 61-51240 | 11/1986 |
| JP | U 06-47617 | 6/1994 |
| JP | A 8-28246 | 1/1996 |
| JP | A 11-114338 | 4/1999 |
| JP | A 2000-279728 | 10/2000 |
| JP | A 2001-162119 | 6/2001 |
| WO | WO 01/51173 A1 | 7/2001 |

OTHER PUBLICATIONS

Gulati "Strength and Thermal Shock Resistance of Segmented Wall-Flow Diesel Filters", SAE Technical Paper Series, pp. 11-18.

* cited by examiner

*Primary Examiner*—Ling Xu
(74) *Attorney, Agent, or Firm*—Oliff & Berridge, PLC

(57) ABSTRACT

A honeycomb structure includes a plurality of honeycomb segments each having a number of throughholes divided from each other by partition walls and extending in the axial direction of honeycomb segment, wherein the honeycomb segments are bonded at their surfaces parallel to the axial direction to form an integrated body, such that the honeycomb segments comprise those honeycomb segments in which the outer portion 6 has a larger per-unit-volume heat capacity than the central portion does.

17 Claims, 6 Drawing Sheets

HONEYCOMB STRUCTURE

TECHNICAL FIELD

The present invention relates to a honeycomb structure used, for example, in an exhaust gas purifier of a heat engine (e.g. an internal combustion engine) or a burner (e.g. a boiler), or in a reformer of a liquid fuel or a gaseous fuel. More particularly, the present invention relates to a honeycomb structure which is small in temperature rise during the use and hardly generates cracks.

BACKGROUND ART

Conventionally, honeycomb structures have been used, for example, in an exhaust gas purifier of a heat engine (e.g. an internal combustion engine) or a burner (e.g. a boiler), or in a reformer of a liquid fuel or a gaseous fuel. It is known that honeycomb structures are also used to capture and remove a particulate substance present in a particle-containing fluid, for example, an exhaust gas emitted from a diesel engine.

In the honeycomb structure used for such a purpose, the sharp temperature change of exhaust gas and the local heating tend to make non-uniform the temperature distribution inside the honeycomb structure, which has caused problems such as crack generation in honeycomb structure and the like. When the honeycomb structure is used particularly as a filter for capturing a particulate substance in an exhaust gas emitted from a diesel engine, it is necessary to burn the fine carbon particles deposited on the filter to remove the particles and regenerate the filter and, in that case, high temperatures are inevitably generated locally in the filter; as a result, a big thermal stress and cracks have tended to generate.

Honeycomb structures have become larger depending upon the application purpose. Hence, it is known to produce a honeycomb structure by bonding a plurality of honeycomb segments. In this case as well, it is necessary to reduce the thermal stress generated.

As a means for reducing the thermal stress, there is disclosed in, for example, U.S. Pat. No. 4,335,783, a process for producing a honeycomb structure, which comprises bonding a large number of honeycomb parts using a discontinuous adhesive. Also in JP-B-61-51240 is proposed a heat shock-resistant rotary regenerating heat exchanging method which comprises forming, by extrusion, matrix segments of honeycomb structure made of a ceramic material, firing them, making smooth, by processing, the outer peripheral portions of the fired segments, coating the to-be-bonded areas of the resulting segments with a ceramic adhesive having, when fired, substantially the same mineral composition as the matrix segments and showing a difference in thermal expansion coefficient, of 0.1% or less at 800° C., and firing the coated segments. Also in a SAE article 860008 of 1986 is disclosed a ceramic honeycomb filter obtained by bonding cordierite honeycomb segments with a cordierite cement and, in this literature, there is disclosed a bonding method for obtaining discontinuous bonded areas. Further in JP-A-8-28246 is disclosed a ceramic honeycomb filter obtained by bonding honeycomb ceramic members with an elastic sealant made of at least a three-dimensionally intertwined inorganic fiber, an inorganic binder, an organic binder and inorganic particles.

Meanwhile, the regulation for exhaust gas has become stricter and engines have come to have higher performances. As a result, in order to achieve an improvement in combustion conditions of engine and an increase in purification ability of catalyst, the temperature of exhaust gas has increased year by year. In this connection, a higher thermal shock resistance has come to be required for honeycomb carriers. Therefore, even with honeycomb structures such as mentioned above, when there is a bigger heat generation during their regeneration, there may arise problems such as generation of cracks, etc. in the applied adhesive or the bonded areas.

Honeycomb structures can have a higher strength by making their partition walls thicker; however, it results in a larger pressure loss and impairment of engine performance, etc. Hence, in JP-B-54-110189 is proposed a honeycomb structure in which the partition wall thickness of honeycomb carrier is made smaller regularly in the cross-section toward the sectional center; and in JP-A-54-150406 and JP-A-55-147154 is proposed a honeycomb structure in which the partition wall thickness of the cells in the outer peripheral portion of the honeycomb structure is made larger than the partition wall thickness of inner cells. These honeycomb structures have a large strength to the stress applied from outside; however, they have no sufficient durability to such a thermal stress as appears when the center of honeycomb structure, in particular, comes to have high temperatures during the use. Further, in these literatures, no mention is made on the partition wall or side wall of each honeycomb segment of a honeycomb structure obtained by bonding of a plurality of honeycomb segments, particularly each honeycomb segment located in the inner portion of the honeycomb structure.

The aim of the present invention is to provide a honeycomb structure wherein the temperature rise during the use is suppressed and the durability to the cracks caused by thermal stress appearing therein during the use is improved further while an increase in pressure loss and a reduction in functions (e.g. purification ability) are suppressed.

DISCLOSURE OF THE INVENTION

The present invention provides a honeycomb structure constituted by a plurality of honeycomb segments each having a number of throughholes divided from each other by partition walls and extending in the axial direction of honeycomb segment, wherein the honeycomb segments are bonded at their surfaces parallel to the axial direction to form an integrated body, characterized in that the honeycomb segments comprise those honeycomb segments in which the outer portion has a larger per-unit-volume heat capacity than the central portion does.

In the present invention, it is preferred that the honeycomb segments each having portions of different heat capacities are honeycomb segments not constituting the side surface of honeycomb structure. It is also preferred that the per-unit-volume heat capacity in the outer portion of each honeycomb segment having portions of different heat capacities is not lower than 1.05 times but not higher than 2.5 times the per-unit-volume heat capacity in the central portion of the honeycomb segment. It is also preferred that the outer portion of each honeycomb segment having portions of different heat capacities occupies 80% or less of the sectional area of the honeycomb segment. It is also preferred that the outer portion of each honeycomb segment having portions of different heat capacities is provided, on the side surface, with a plate, preferably a plate having a volume which is not larger than [(the area of plate-provided side surface)×5 mm]. It is also preferred that the center of the plate in the axial direction of honeycomb segment is closer than the center of honeycomb segment in the same direction, to the end face of honeycomb segment from which a to-be-treated fluid is to leave. It is also preferred that the partition walls in the outer portion of each honeycomb segment have a larger average thickness than the partition walls in the central portion do. It is also preferred that the average thickness of the side wall of each honeycomb segment is larger than the average thickness of the partition walls. It is also preferred that, in the section of each honeycomb segment normal to its axial direction, part or all of the partition walls have such inclined thicknesses that are smaller from the point of contact of partition wall with side wall towards the inner portion of the honeycomb segment. It is further preferred that the thickness of the partition walls having inclined thicknesses, at the point of contact of partition wall with side wall is 2.5 times or less the smallest thickness of said partition walls. It is also preferred that part or all of the intersections between partition walls in the outer portion and part or all of the points of contact of partition wall with side wall have a larger (preferably 3 to 10 times) radius of curvature than the intersections between partition walls in the central portion do.

BRIEF DESCRIPTION OF THE DRAWINGS

FIG. 1(a) is a perspective view and FIG. 1(b) is a schematic sectional view.

FIG. 2(a) is a perspective view, and FIG. 2(b) and FIG. 2(c) are each a schematic sectional view.

FIG. 3(a) is a sectional view and FIG. 3(b) is a side view.

BEST MODE FOR CARRYING OUT THE INVENTION

Figure 1A:
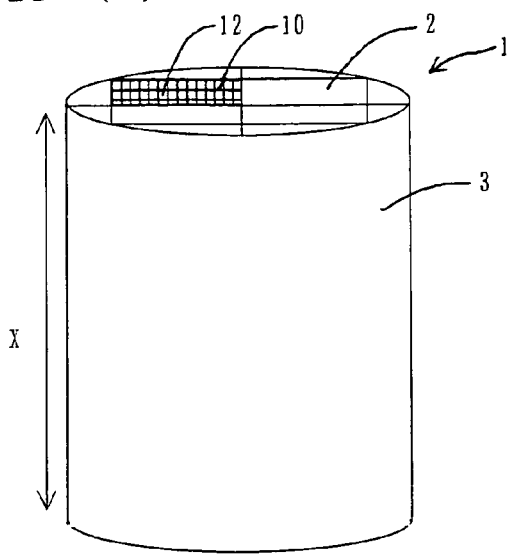
FIG. 1(a) and FIG. 1(b) are schematic drawings showing one mode of the honeycomb structure of the present invention.

The contents of the honeycomb structure of the present invention are described in detail below with reference to the accompanying drawings. However, the present invention is not restricted to the following embodiments. Incidentally, in the following, "section" means a section normal to the axial direction (X direction) of honeycomb structure or honeycomb segment, unless otherwise specified.

The honeycomb structure of the present invention is, as shown in FIG. 1(a) and FIG. 1(b) and FIG. 2(a) to FIG. 2(c), a honeycomb structure 1 constituted by a plurality of honeycomb segments 2 each having a number of throughholes 12 divided from each other by partition walls 10 and extending in the axial direction (X direction) of honeycomb segment, wherein the honeycomb segments 2 are bonded at their surfaces (side surfaces 4) parallel to the axial direction (X direction) to form an integrated body. Incidentally, in FIG. 1(a) and FIG. 1(b) and FIG. 2(a) to FIG. 2(c), partition walls 10 and throughholes 12 are shown only for part of the honeycomb segments; however, needless to say, all the honeycomb segments have such partition walls 10 and throughholes 12.

Figure 2A:
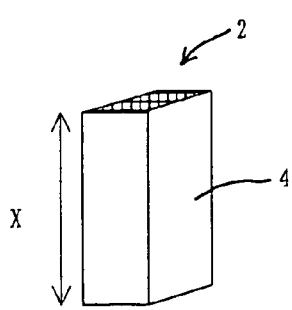
FIG. 2(a), FIG. 2(b) and FIG. 2(c) are schematic drawings showing one mode of the honeycomb segment of the present invention.
Figure 2B:
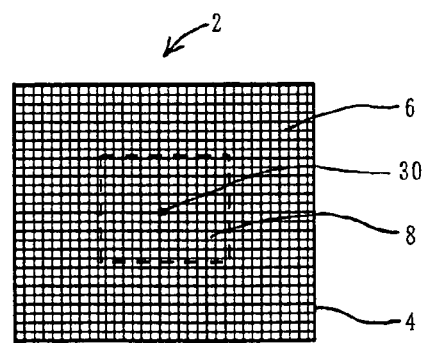
Figure 2C:
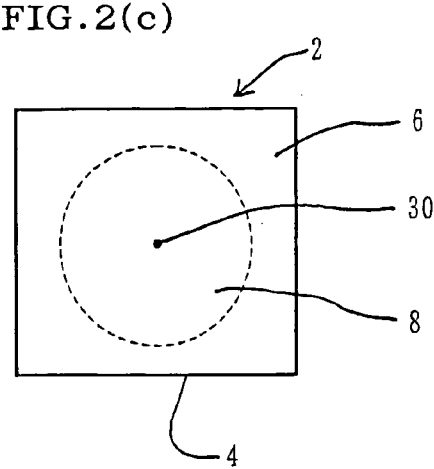

The important characteristic of the present invention lies in that the honeycomb structure 1 comprises those honeycomb segments 2 in which the outer peripheral portion 6 has a larger (preferably 1.05 to 2.5 times) per-unit-volume heat capacity than the central portion 8 does. By employing such a constitution, the temperature rise of the honeycomb structure 1 can be suppressed with no increase in pressure loss or without substantial impairment of functions (e.g. purification ability) and the honeycomb structure 1 can be prevented from breakage. The central portion 8 is, as shown in FIG. 2(b), a portion which has its center at the central point 30 of the section of the honeycomb segment 2 and which is surrounded by sides similar to the side surfaces 4 of the honeycomb segment 2, or, as shown in FIG. 2(c), a portion surrounded by a circle; and the central portion 8 occupies preferably 20 to 90%, more preferably 40 to 80%, further preferably 50 to 70% of the sectional area of the honeycomb segment 2. When the heat capacity or sectional area of the outer portion 6 is too large, the total heat capacity of the honeycomb segment 2 is too large, resulting in impairment of functions (e.g. purification ability), which is not preferred. When the heat capacity or sectional area of the outer portion 6 is too small, the meritorious effects of the present invention are not obtained sufficiently. The outer portion 6 is a portion which is outside the central portion 8 of the honeycomb segment 2 and which is other than the central portion; and the outer portion 6 occupies preferably 10 to 80%, more preferably 20 to 60%, further preferably 30 to 50% of the sectional area of the honeycomb segment 2. In the present invention, "per-unit-volume heat capacity" means a heat capacity based on a volume including throughholes 12.

Figure 3A:
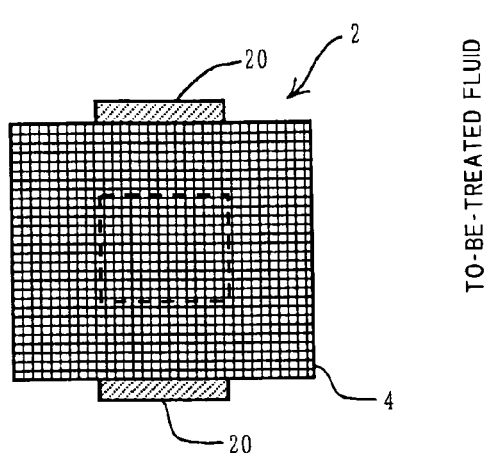
FIG. 3(a) and FIG. 3(b) are schematic drawings showing one mode of the honeycomb segment of the present invention.
Figure 3B:
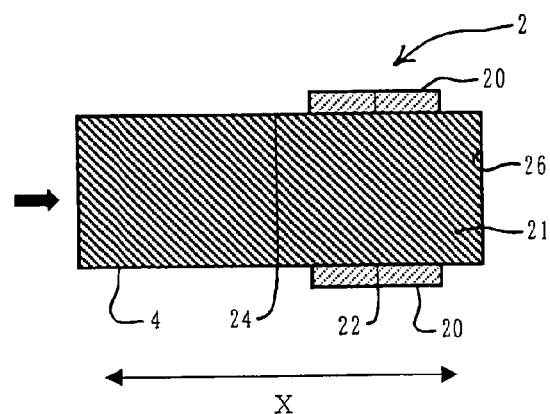

In order to make the heat capacity of the outer portion 6 of the honeycomb segment 2 larger than the heat capacity of the central portion 8, it is preferred to provide, as shown in, for example, FIG. 3(a) and FIG. 3(b), a plate 20 on part or the whole part of the side surfaces 4 of the honeycomb segment 2. In this case, the plate becomes part of the outer portion 6 of the honeycomb segment 2. The plate 20 preferably has a volume which is [(the surface area of each side surface 4 provided with the plate 20)×5 mm] or less. When a volume of the plate is too large, the distance between adjacent honeycomb segments 2 is too large, resulting in an increase in pressure loss, which is not preferred. When the plate 20 is provided on part of the side surfaces 4, it is preferred that, as shown in FIG. 3(b), the center 22 of the plate 20 in the axial direction (X direction) of honeycomb segment is closer than the center 24 of honeycomb segment main body 21 in the same direction, to the end face 26 of honeycomb segment from which a to-be-treated fluid is to leave. By employing such a constitution, it is possible to effectively suppress the temperature rise at the outlet of the honeycomb structure, which tends to show a larger temperature rise.

Figure 4A:
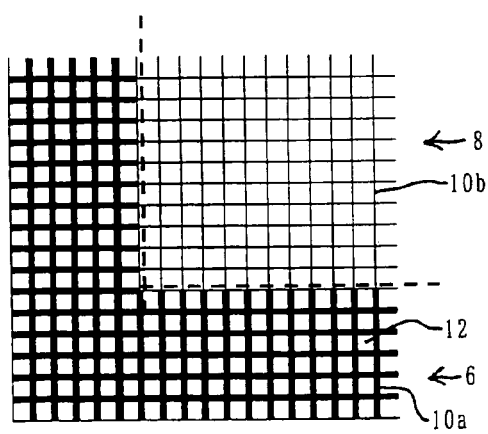
FIG. 4(a) and FIG. 4(b) are each a schematic sectional fragmentary view showing one mode of the honeycomb segment of the present invention.
Figure 4B:
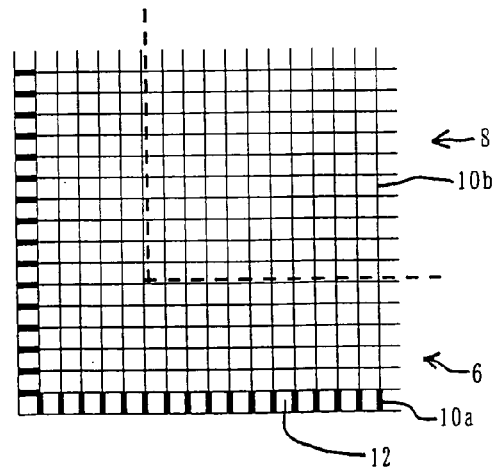

In other preferred embodiments of the present invention, part or all of the partition walls 10a in the outer portion 6 are allowed to have a larger thickness than the partition walls 10b in the central portion 8 do, as shown in FIG. 4(a) and FIG. 4(b); thereby, the partition walls 10a in the outer portion 6 have a larger average thickness than the partition walls 10b in the central portion 8. When part of the partition walls 10a in the outer portion 6 are allowed to have a larger thickness it is preferred that the partition walls 10a surrounding the outermost throughholes 12 are allowed to have a larger thickness as shown in FIG. 4(b). Preferably, the average thickness of the partition walls 10a in the outer portion 6 is 2.5 times or less the average thickness of the partition walls 10b in the central portion 8. When the thickness of the partition walls 10a in the outer portion 6is too large, too large a pressure loss appears and impairment of engine performance, etc. is incurred, which is not preferred.

Figure 5:
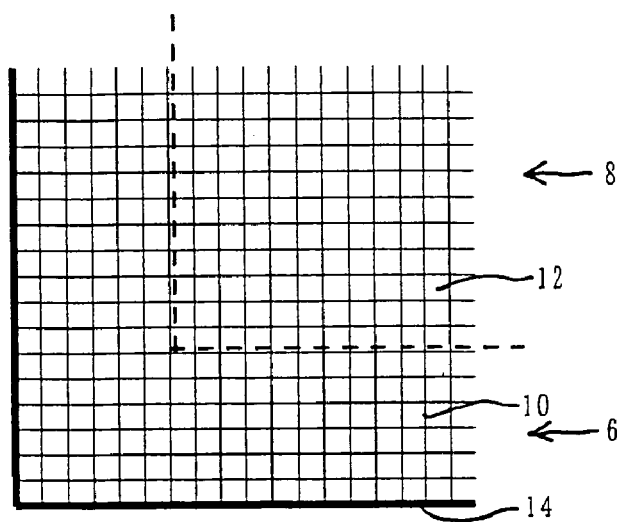
FIG. 5 is a schematic sectional fragmentary view showing one mode of the honeycomb segment of the present invention.

In still other preferred embodiment of the present invention, the average thickness of the side wall 14 of honeycomb segment 2 is allowed to be larger than the average thickness of the partition walls 10, as shown in FIG. 5. The average thickness of the side wall 14 is preferably 1.5 to 5 times the average thickness of the partition walls 10. When the average thickness of the side wall 14 is too large, too large a pressure loss appears and impairment of engine performance, etc. is incurred, which is not preferred. When the average thickness of the side wall 14 is too small, the meritorious effects of the present invention are not obtained sufficiently.

Figure 6:
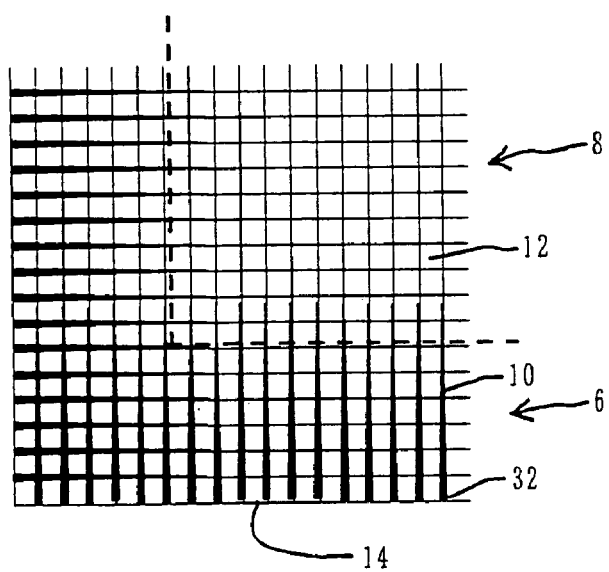
FIG. 6 is a schematic sectional fragmentary view showing one mode of the honeycomb segment of the present invention.

In still other preferred embodiment of the present invention, as shown in FIG. 6, part or all of the partition walls 10 are allowed to have, in the section of each honeycomb segment 2, such inclined thicknesses that become smaller from the point 32 of contact of partition wall with side wall 14 towards the inner portion of the honeycomb segment and, preferably, the thicknesses of partition walls 10 are made gradually smaller from the outermost throughholes 12 toward the inside of honeycomb segment up to the partition walls 10 surrounding the 2nd to 10th throughholes 12. Here, "inclined thicknesses" mean that the average thickness of partition walls 10 surrounding throughholes 12 of certain position relative to side wall is larger than the average thickness of partition walls 10 surrounding those throughholes 12 adjacent to the above throughholes but located inside them. The inclined thicknesses may be continuously changing thicknesses as shown in, for example, FIG. 6, or may be such that the partition walls 10 surrounding throughholes 12 of certain position have a thickness different from that of the partition walls 10 surrounding throughholes 12 of next position. In this case, the partition walls contacting with the side wall 14 at contact points 32 have the largest thickness, and this thickness is preferred to be 2.5 times or less the smallest thickness of all the partition walls 10. When this thickness is too large, too large a pressure loss appears and impairment of engine performance, etc. is incurred, which is not preferred.

Figure 7A:
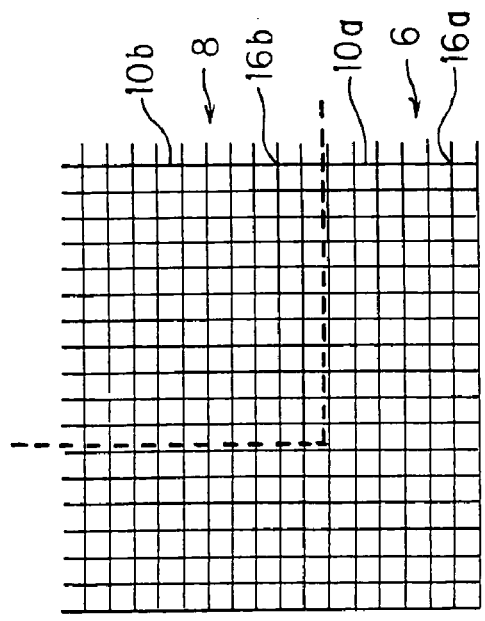
FIG. 7(a) is a schematic sectional fragmentary view showing one mode of the honeycomb segment of the present invention.
Figure 7B:
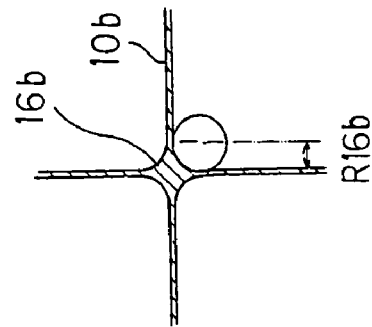
FIG. 7(b) to FIG. 7(e) are each an enlarged view of an intersection between partition walls.
Figure 7C:
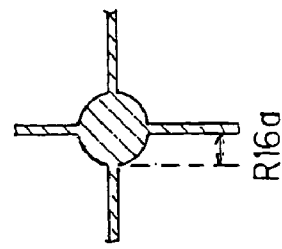
Figure 7D:
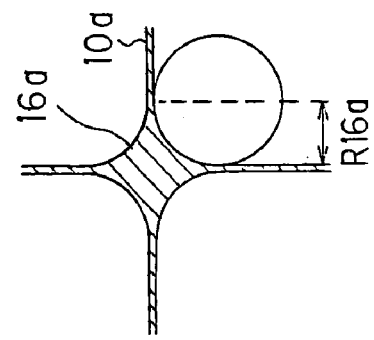
Figure 7E:
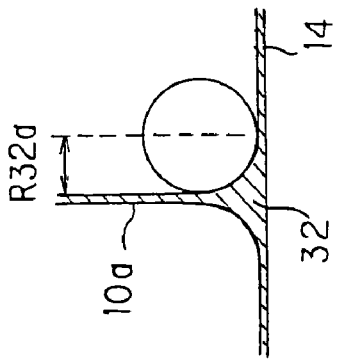

In still other preferred embodiment of the present invention, in the section of each honeycomb segment, part or all of the radii of curvatures (R16a) at the intersections 16a between partition walls 10a in the outer portion 6 and part or all of the radii of curvatures (R32a) at the contact points 32 between partition wall 10a and side wall 14 are allowed to be larger than the radii of curvatures (R16b) at the intersections 16b between partition walls 10b in the central portion 8, as shown in FIG. 7(a), FIG. 7(b), FIG. 7(c) and FIG. 7(d). By employing such a constitution, an increase in heat capacity can be achieved while a reduction in pressure loss is more suppressed. The radii of curvatures R16a and/or R32a are preferably 2 to 10 times, more preferably 3 to 5 times R16b. When the radii of curvatures are too large, the sectional area of throughholes is too small and too large a pressure loss is invited, which is not preferred. When the level of the radii of curvatures relative to R16b is too small, an increase in heat capacity is unobtainable, which is not preferred. The sectional area of the intersections between partition walls 10 may have a circular section as shown in FIG. 7(e); in this case, the radius R16a of the circular intersection 16a between partition walls 10a in the outer portion 6 is preferably 1.5 to 5 times the radius R16b of a circular area in the intersection 16b between partition walls 10b in the central portion 8.

The honeycomb structure 1 of the present invention is constituted by integrating a plurality of honeycomb segments 2 comprising the above-mentioned honeycomb segments 2. In that case, all the honeycomb segments may have the above-mentioned characteristic of the present invention, or part of the honeycomb segments may have the above-mentioned characteristic of the present invention. When part of the honeycomb segments are allowed to have the above-mentioned characteristic of the present invention, it is preferred that the honeycomb segments not constituting the side wall 3 of honeycomb structure 1, i.e. 2a in FIG. 1(b) have the above-mentioned characteristic of the present invention. By employing such a constitution, the temperature rise in the central portion of honeycomb structure 1 can be prevented and the cracks of honeycomb structure caused by thermal stress can be prevented more effectively.

In the present invention, the thicknesses of partition walls 10 of honeycomb segment 2 are preferably 50 to 2,000 μm. When the thicknesses of partition walls are less than 50 μm, the strength of honeycomb segment is insufficient; when the thicknesses are more than 2,000 μm, the effective GSA of honeycomb segment is small and moreover the pressure loss in gals flow is large.

Figure 1B:
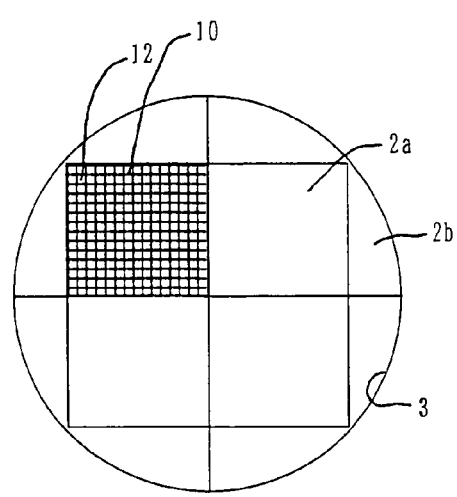

The sectional shape (cell shape) of the throughholes 12 of each honeycomb segment 2 of the present invention is preferably any of a triangle, a tetragon, a hexagon and a corrugation for easiness of honeycomb segment production. In FIG. 1(a) and FIG. 1(b), partition walls 10 and throughholes 12 are shown only for part of the honeycomb segments 2; actually, however, the partition walls 10 and the throughholes 12 are present in all the honeycomb segments.

The density of the cells formed by partition walls, i.e. the number of throughholes 12 (cells) per unit area of section of honeycomb segment 2 is preferably 6 to 2,000 cells/in.$^2$ (0.9 to 311 cells/cm$^2$), more preferably 50 to 400 cells/in.$^2$ (7.8 to 62 cells/cm$^2$). When the cell density is less than 6 cells/in.$^2$ (0.9 cells/cm$^2$), the honeycomb segment is insufficient in strength and effective GSA (geographical surface area); when the cell density is more than 2,000 cells/in.$^2$ (311 cells/cm$^2$), the honeycomb segment shows a large pressure loss when a gas flows therethrough.

As to the sectional shape of each honeycomb segment 2, there is no particular restriction. It is preferred that the honeycomb segment 2 has a basic tetragonal shape and the shapes of the honeycomb segments 2b constituting the side wall 3 of a honeycomb structure 1 to be produced are matched to the shape of the honeycomb structure 1. It is also possible to allow each honeycomb segment 2 to have a fan-shaped section.

In the present invention, the main component of the honeycomb segment 2 is preferred to comprise at least one kind of ceramic selected from the group consisting of cordierite, mullite, alumina, spinel, silicon carbide, silicon nitride, lithium aluminum silicate, aluminum titanate and combinations thereof, a Fe—Cr—Al type metal, or metallic Si and SiC, from the standpoint of the strength, heat resistance, etc. of honeycomb segment 2. Silicon carbide which is high in thermal conductivity, is particularly preferred because it releases the heat easily. Here, the expression "main component" of honeycomb segment means a component constituting 80% by mass or more of the honeycomb segment 2.

In the present invention, when each honeycomb segment and the adhesive used are made of metallic Si and SiC, the Si content in the honeycomb segment, specified by Si/(Si+SiC) is preferably 5 to 50% by mass, more preferably 10 to 40% by mass. The reason is that when the Si content is less than 5% by mass, there is no effect of Si addition and, when the Si content is more than 50% by mass, it is impossible to obtain heat resistance and high thermal conductivity which are characteristics of SiC.

In this case, it is desired that the Si content of the adhesive, specified by Si/(Si+SiC) is equal to or higher than that of the honeycomb segment and is 10 to 80% by mass. When the Si content of the adhesive is lower than that of the honeycomb segment, no required bonding strength is obtained; when the Si content is higher than 80% by mass, no sufficient oxidation resistance is obtained at high temperatures.

In the present invention, it is preferred that the main component of the plate 20 has a large specific heat and, similarly to the above-mentioned main component of honeycomb segment 2, comprises at least one kind of ceramic selected from the group consisting of cordierite, mullite, alumina, spinel, silicon carbide, silicon nitride, lithium aluminum silicate, aluminum titanate and combinations thereof; a Fe—Cr—Al type metal; or metallic silicon and SiC.

In order to integrate honeycomb segments into one piece, it is preferred to, for example, bond them by using an adhesive. The main component of the adhesive can be selected from the materials preferable as the above-mentioned main components for honeycomb segment.

When the honeycomb structure of the present invention is used as a catalyst carrier for purification of exhaust gas emitted from heat engine (e.g. internal combustion engine) or burner (e.g. boiler), or for reforming of liquid fuel or gaseous fuel, it is preferred to load, on the honeycomb structure, a catalyst, for example, a metal having a catalytic activity. As representative metals having a catalytic activity, there can be mentioned Pt, Pd and Rh. At least one kind of these metals is preferred to be loaded on the honeycomb structure.

Meanwhile, when the honeycomb structure of the present invention is used as a filter (e.g. a diesel particulate filter) for capturing and removing a particulate substance present in a particle-containing fluid, it is preferred that the individual honeycomb segments used therein has such a structure that the partition walls of throughholes have a filtration ability, given throughholes are plugged at one end of honeycomb segment, and the remainder throughholes are plugged at the other end of honeycomb segment.

When a particle-containing fluid is introduced into the honeycomb structure constituted by such honeycomb segments, at its one end, the particle-containing fluid enters the inside of the honeycomb structure from those throughholes not plugged at the one end, passes through porous partition walls having a filtration ability, and enters those throughholes not plugged at the other end of honeycomb structure. When the particle-containing fluid passes through the partition walls, the particulate substance present in the fluid is captured by the partition walls, and the particulate substance-removed, purified fluid is discharged from the other end of honeycomb structure.

When the honeycomb structure of the present invention is used as a filter, the captured particulate substance deposits on the partition walls. As the deposition proceeds, the filter is blocked and its function decreases; therefore, the honeycomb structure is heated periodically by a heating means such as heater or the like to burn and remove the particulate substance and regenerate the filter function. In order to accelerate the burning of the particulate substance during the regeneration, the above-mentioned catalyst may be loaded on the honeycomb structure.

Next, description is made on the process for producing the honeycomb structure of the present invention. However, the process for producing the honeycomb structure of the present invention is not restricted thereto.

As a raw material powder for honeycomb segment, there is used an above-mentioned suitable material, for example, a silicon carbide powder. Thereto are added a binder, for example, methyl cellulose and hydroxypropoxymethyl cellulose. Further, a surfactant and water are added to produce a plastic puddle. This puddle is subjected to extrusion molding to produce honeycomb segments such as shown in FIG. 2(*a*) to FIG. 2(*c*) and FIG. 4(*a*) to FIG. 7(*e*).

These plurality of honeycomb segments are dried using, for example, a micro wave and hot air; then, for example, an adhesive having the same composition as the above puddle is coated on the side surfaces 4 of the honeycomb segment of FIG. 2(*a*) and the honeycomb segments are bonded into an integrated body; and the integrated body is dried. The dried body is heated in, for example, a $N_2$ atmosphere for debinding and then fired in an inert atmosphere such as Ar or the like, whereby a honeycomb structure of the present invention can be obtained.

In the present invention, in order to bond honeycomb segments, there is used the above-mentioned method of coating an adhesive directly on side surfaces 4. Alternatively, it is possible to use a plate 20 of given thickness made of an adhesive and bond honeycomb segments to each other using this plate and an adhesive.

A honeycomb structure having throughholes plugged at either one end can be produced by producing a honeycomb structure by the above method and then plugging the throughholes alternately at each end of the honeycomb structure.

Loading of a catalyst on the thus-produced honeycomb structure can be conducted by a method ordinarily used by those skilled in the art. For example, a catalyst slurry is wash-coated on a honeycomb structure and the resulting honeycomb structure is dried and fired, whereby a catalyst can be loaded.

The present invention is described in more detail below by way of Examples. However, the present invention is in no way restricted to these Examples.

EXAMPLE 1

There was used, as a raw material, a mixed powder consisting of 80% by mass of a SiC powder and 20% by mass of a metallic Si powder. Thereto were added methyl cellulose, hydroxypropoxymethyl cellulose, a surfactant and water to produce a plastic puddle. This puddle was subjected to extrusion molding to obtain quadrangular pyramid-shaped honeycomb segments 2 each of 0.30 mm in partition wall thickness, 300 cells/in.$^2$ (46.50 cells/cm$^2$) in cell density and 55 mm in length of one side. The honeycomb segments 2 were dried using a microwave and hot air. Then, using a slurry containing the same materials as used in production of the above honeycomb segments, each throughhole of each honeycomb segment was plugged at either one end of segment so that each two adjacent throughholes were plugged at different ends of honeycomb segment.

Figure 8A:
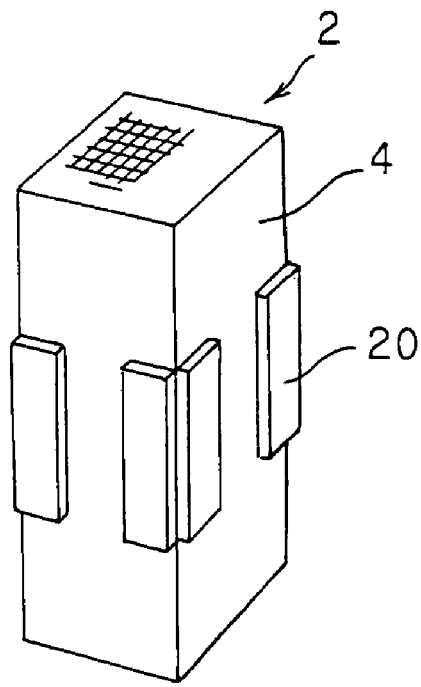
FIG. 8(a) is a perspective view of the honeycomb segment produced in Example 1.
Figure 8B:
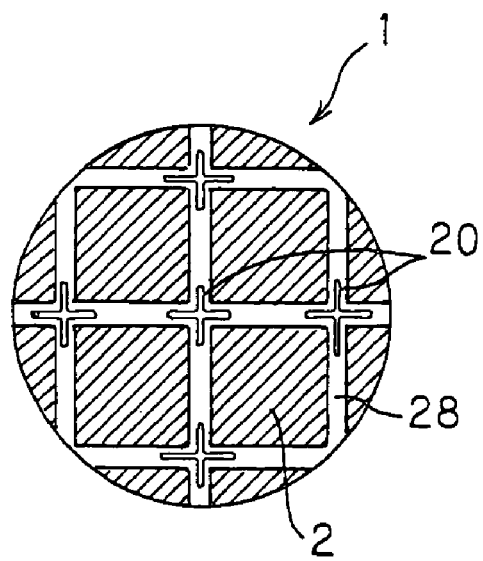
FIG. 8(b) is a schematic sectional view of the honeycomb structure produced in Example 1.

Plates 20 each of 16 mm×60 mm×2.5 mm were produced in the same manner as above, using the same materials as used in production of the above honeycomb segments. They were attached to the side surfaces 4 of the honeycomb segments as shown in FIG. 8(a), using an adhesive 28 made of the same materials as used in production of the honeycomb segments but having a lower viscosity. The plate-attached honeycomb segments were dried, subjected to debinding at about 400° C. in a N$_2$ atmosphere, and fired at about 1,550° C. in an Ar inert atmosphere to obtain honeycomb segments. These honeycomb segments 2 were bonded to each other using a mixture of a ceramic fiber, a ceramic powder, an organic binder and an inorganic binder, and processed to obtain a columnar honeycomb structure of 144 mm (diameter) and 153 mm (height) having a sectional shape shown in FIG. 8(b).

COMPARATIVE EXAMPLE 1

Figure 8C:
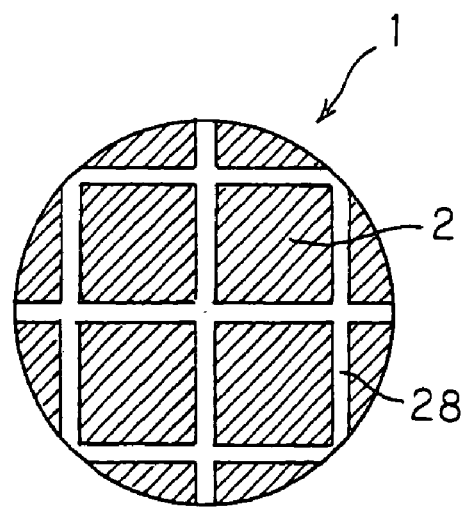
FIG. 8(c) is a schematic sectional view of the honeycomb structure produced in Comparative Example 1.

A honeycomb structure shown in FIG. 8(c) was obtained in the same manner as in Example 1 except that no plate 20 was used.

Figure 9:
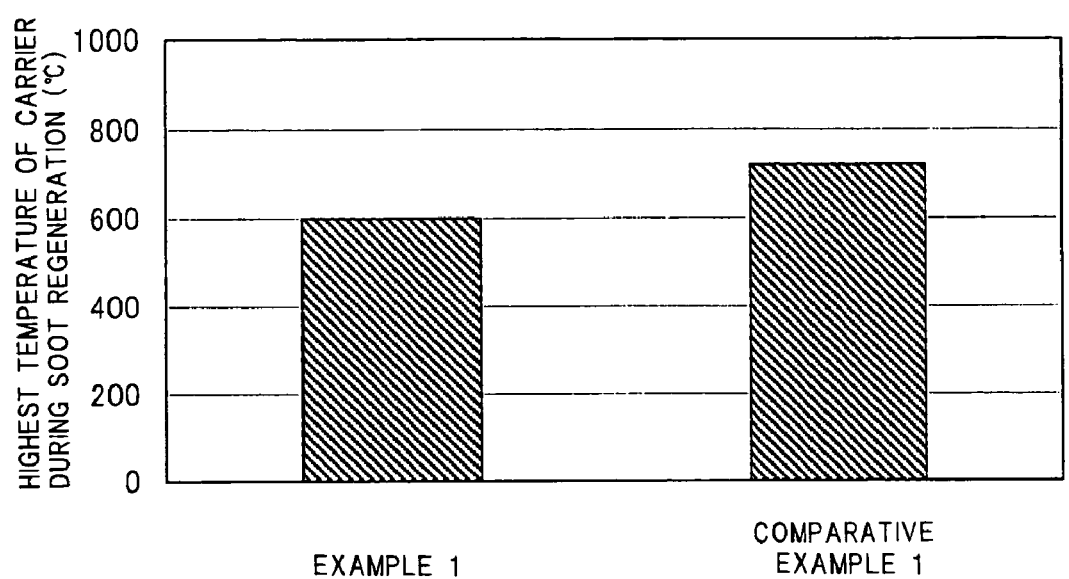
FIG. 9 is a graph showing the highest temperature seen during the soot regeneration in Example.

A ceramic-made non-intumescent mat as a holding material was wound round the circumference (side) of each of the honeycomb structures obtained in Example 1 and Comparative Example 1. Each of the mat-wound honeycomb structures was stuffed in a SUS 409-made casing, to prepare a canned structure. A soot-containing combustion gas generated by combustion of a diesel gas oil was allowed to flow into each canned structure from its lower end and leave from the upper end, whereby the soot was captured inside the honeycomb structure. The honeycomb structure was then cooled to room temperature, after which a combustion gas containing a given proportion of oxygen was allowed to flow into the honeycomb structure at 650° C. from its lower end to burn and remove the soot. Thus, a filter regeneration test was carried out. The weight of captured soot was five levels of 10, 12, 14, 16 and 18 g/l (liter), and generation of cracks in the honeycomb structure after filter regeneration test was examined visually. The results are shown in Table 1. Also, the highest temperature in combustion test at the captured soot amount of 12 g/l was measured. The results are shown in FIG. 9. It is clear from Table 1 that the honeycomb structure obtained in Example 1, as compared with the conventional honeycomb structure obtained in Comparative Example 1, showed an increase in the critical soot amount which gives no breakage. Also, it is clear from FIG. 9 that the highest temperature was lower in the honeycomb structure obtained in Example 1.

TABLE 1

| | Amount of captured soot | | | | |
|---|---|---|---|---|---|
| | 10 g/l | 12 g/l | 14 g/l | 16 g/l | 18 g/l |
| Example 1 | ○ | ○ | ○ | ○ | X |
| Comparative Example 1 | ○ | ○ | ○ | X | |

INDUSTRIAL APPLICABILITY

As described above, in the honeycomb structure of the present invention, the heat capacity of the outer portion of honeycomb segments constituting the honeycomb structure has been made larger than the heat capacity of the central portion; as a result, the temperature rise during the use has been suppressed and the durability to thermal stress has been increased.

The invention claimed is:

1. A honeycomb structure constituted by a plurality of honeycomb segments, each honeycomb segment having a number of throughholes divided from each other by partition walls and extending in an axial direction of the honeycomb segment, wherein the honeycomb segments are bonded at their surfaces parallel to the axial direction to form an integrated body having a central portion and an outer portion, wherein a per-unit-volume heat capacity of the outer portion is between 1.05 times and 2.5 times a per-unit-volume heat capacity of the central portion.

2. The honeycomb structure according to claim 1, wherein the honeycomb segments, each having portions of different heat capacities, are the honeycomb segments not constituting the side surface of the honeycomb structure.

3. The honeycomb structure according to claim 1, wherein the outer portion of the each honeycomb segment occupies at least 20% of a sectional area of the honeycomb segment, and the central portion of the each honeycomb segment occupies at least 80% of the sectional area of the honeycomb segment.

4. The honeycomb structure according to claim 1, wherein the outer portion of the each honeycomb segment, having portions of different heat capacities, is provided with a plate on the side surface.

5. The honeycomb structure according to claim 4, wherein the plate has a volume which is not larger than [(the area of plate-provided side surface)×5 mm].

6. The honeycomb structure according to claim 4, wherein the center of the plate in the axial direction of the honeycomb segment is closer than the center of the honeycomb segment in a same direction to the end face of the honeycomb segment from which a to-be-treated fluid is to leave.

7. The honeycomb structure according to claim 1, wherein the partition walls in the outer portion of the each honeycomb segment have a larger average thickness than the partition walls in the central portion do.

8. The honeycomb structure according to claim 1, wherein the average thickness of the side wall of the each honeycomb structure is larger than the average thickness of the partition walls.

9. The honeycomb structure according to claim 1, wherein, in the section of the each honeycomb segment normal to its axial direction, part or all of the partition walls have such inclined thicknesses that are smaller from the point of contact of partition wall with side wall towards the inner portion of the honeycomb segment.

10. The honeycomb structure according to claim 9, wherein the thickness of the partition walls, having inclined thicknesses at the point of contact of the partition wall with side wall, is 2.5 times or less the smallest thickness of said partition walls.

11. The honeycomb structure according to claim 1, wherein the main component of the each honeycomb segment comprises at least one kind of ceramic selected from the group consisting of cordierite, molite, alumina, spinel, silicon carbide, silicon nitride, lithium aluminum silicate, aluminum titanate and combinations thereof; a Fe—Cr—Al type metal; or metallic silicon and SiC.

12. The honeycomb structure according to claim 1, wherein the each honeycomb segment has a catalyst loaded thereon.

13. The honeycomb structure according to claim 12, wherein the catalyst is at least one kind selected from Pt, Pd and Rh.

14. The honeycomb structure according to claim 13, wherein the throughholes of the each honeycomb segment have a sectional shape of any of a triangle, a tetragon, a hexagon and a corrugation.

15. The honeycomb structure according to claim 1, wherein, in the each honeycomb segment, the partition walls surrounding the throughholes have a filtration ability, given throughholes are plugged at one end of the honeycomb segment, and the residual throughholes are plugged at the other end of the honeycomb segment.

16. The honeycomb structure according to claim 15, whereby the honeycomb structure is used as a filter for capturing and removing a particulate substance present in a particle-containing fluid.

17. A honeycomb structure constituted by a plurality of honeycomb segments, each honeycomb segment having a number of throughholes divided from each other by partition walls and extending in an axial direction of the honeycomb segment, the honeycomb segments being bonded at their surfaces parallel to the axial direction to form an integrated body having a central portion and an outer portion, wherein in the section of the each honeycomb segment normal to its axial direction, part or all of intersections between the partition walls in the outer portion and part or all of points of contact of a partition wall with side wall have a larger radius of curvature than intersections between the partition walls in the central portion do.

* * * * *